United States Patent

Jagiella et al.

[11] Patent Number: 5,500,504
[45] Date of Patent: Mar. 19, 1996

[54] NOZZLE FOR A TOOL FOR THE WORKING OF MATERIAL

[75] Inventors: Manfred Jagiella, Karlsruhe; Wolf Wiesemann, Gaggenau; Peter Schubert, Neukirch; Michael Holzmann, Rastatt; Georg Spörl, Gaggenau, all of Germany

[73] Assignee: C. A. Weidmüller GmbH & Co., Detmold, Germany

[21] Appl. No.: 788,864

[22] Filed: Nov. 7, 1991

[30]   Foreign Application Priority Data

Nov. 7, 1990 [DE] Germany ............................ 40 35 403.2
Nov. 7, 1990 [DE] Germany ............................ 40 35 404.0
Jun. 11, 1991 [DE] Germany ............................ 41 19 244.3
Oct. 7, 1991 [DE] Germany ............................ 41 33 198.2

[51] Int. Cl.[6] ................................................ B23K 26/14
[52] U.S. Cl. .................... 219/121.67; 219/121.7
[58] Field of Search ............ 219/121.6, 121.63, 219/121.65, 121.67, 121.68, 121.7, 121.79, 121.11, 121.78, 121.84

[56]   References Cited

U.S. PATENT DOCUMENTS

| 4,298,784 | 11/1981 | Schmall | 219/124.02 |
| 4,467,171 | 8/1984 | Ramos | 219/121.67 |
| 4,794,222 | 12/1988 | Funayama et al. | 219/121.78 |
| 5,128,508 | 7/1992 | Klingel | 219/121.72 |
| 5,192,847 | 3/1993 | Jagiella et al. | 219/121.6 |

*Primary Examiner*—Tu Hoang
*Attorney, Agent, or Firm*—Anderson Kill Olick & Oshinsky

[57]   ABSTRACT

A nozzle for a tool for the working of material and having a nozzle body which is composed of electrically conducting material and carries a nozzle electrode in its tip region with the tip region of the nozzle body and the remaining region of the nozzle body being formed by separate parts which are connected to one another and electrically insulated from one another, the nozzle electrode being in direct electrical contact with the tip region.

29 Claims, 2 Drawing Sheets

NOZZLE FOR A TOOL FOR THE WORKING OF MATERIAL

BACKGROUND OF THE INVENTION

The invention relates to a nozzle for a tool for the working of material.

A nozzle of this kind has already been disclosed in German Patent Application P 40 28 338.0. This nozzle has a nozzle body which is composed of an electrically conducting material and, in its tip region, carries a nozzle electrode. The nozzle electrode is held in the tip with the aid of a cap element which accommodates the electrode. The cap element is composed of electrically conducting material and is electrically insulated from the nozzle electrode.

The nozzle can be used, for example, for working metallic workpieces with the aid of laser radiation, for example for cutting a workpiece with the aid of a high-power laser beam. The laser beam here passes through a channel in the center of the nozzle, said channel also leading through the nozzle electrode.

The nozzle electrode is used for capacitive clearance measurement in order to guide the nozzle relative to the workpiece. For this purpose, a sensor signal which is supplied by the nozzle electrode and appears at the outlet of a plug socket connected to the nozzle body undergoes further processing. In the conventional nozzle, the nozzle electrode is positioned in an insulating body which is of hollow-cylindrical design and, for its part, is arranged in the interior of the tip region of the nozzle body. This insulating body can, for example, be composed of ceramic. Due to the wall thickness of the insulating body, however, the nozzle has a relatively large diameter in its tip region. Particularly in the case of an insulating body of ceramic, it is not possible arbitrarily to reduce the wall thickness further due to reasons connected with production and stability, with the result that the nozzle is relatively thick in its tip region. It cannot be used therefore in some areas of application in which as slim a nozzle shape as possible is demanded, for example in the three-dimensional working of motor-vehicle parts, and the like.

On the other hand, due to the insulating body used, only poor cooling of the nozzle electrode is possible since it prevents dissipation of the heat towards the nozzle body. Particularly in the case of prolonged operation or in the case of operation at high power, the nozzle electrode may therefore heat up to an impermissibly high degree.

The use of an insulating body for positioning the nozzle electrode furthermore increases the cost of the nozzle construction, particularly if high requirements are made of the heat resistance of the insulating body and, for this purpose, it is manufactured from ceramic.

SUMMARY OF THE INVENTION

Accordingly, it is an object of the present invention to further develop a nozzle of the type previously stated in such a way that it can be of slimmer design in its tip region, ensure better cooling of the nozzle electrode and can be manufactured more cheaply.

Pursuant to this object, and others which will become apparent hereafter, one aspect of the present invention resides in a nozzle in which the tip region of the nozzle body and its remaining region are formed by separate parts. The nozzle electrode is in direct contact with the tip region and the tip region is electrically insulated from the remaining region of the nozzle body.

By means of this construction it is possible to achieve a very slim nozzle shape since the tip region of the nozzle body can be of a relatively thin and slim design and the nozzle electrode can be secured directly on the tip region, i.e. without the interposition of an insulating body between the nozzle body and the nozzle electrode. Since the nozzle electrode no longer rests in an insulating body, its heat can also be dissipated better to the nozzle body, virtually the entire nozzle thus serving as a cooling element. The heat thus flows from the nozzle electrode, via the tip region, to the remaining region of the nozzle body, the insulation between the tip region and the remaining region of the nozzle body being designed in such a way that the flow of heat is not appreciably reduced thereby. The selected thickness of the insulation between the tip region and the remaining region of the nozzle body can be very small since, in practice, it is not subjected to very high mechanical loads. On the other hand, the contact area in this region between the tip region and the remaining region of the nozzle body is relatively large, leading to efficient heat dissipation.

In comparison to the conventional nozzle, the nozzle according to the invention can also be manufactured at a more favorable cost since it is possible to dispense with the manufacture and assembly of the insulating body for accommodating the nozzle electrode.

The tip region and the remaining region of the nozzle body can, for example, be firmly connected to one another via an electrically insulating adhesive, the adhesive used being, for example, a ceramic adhesive.

It is also possible to provide the remaining region of the nozzle body and/or the tip region with an electrically insulating surface coating, at least in their connection region. This surface coating provided for the electrical insulation of both parts can, for example, be an oxide layer if the remaining region of the nozzle body and the tip region are composed of oxidizable, electrically conducting materials. The remaining region of the nozzle body can, for example, be manufactured from aluminum and can have an anodized layer as the surface coating. The same can apply to the tip region, although this can also be manufactured from some other conducting material, for example brass.

For the purpose of insulating the tip region from the remaining region of the nozzle body, the surface coating can also be composed of some other suitable material, for example of Teflon or a vapor-deposited ceramic material.

Both parts are then connected firmly to one another, for example by means of a suitable adhesive after having been inserted into one another.

It is also possible to connect the remaining region of the nozzle body and the tip region to one another via an electrically insulating nozzle-body part, for example via a metal ring provided with an insulator. However, this ring can also be composed exclusively of insulating material if dissipation of the heat from the nozzle electrode is not particularly important.

The remaining region of the nozzle body, the tip region and, if required, the nozzle-body part are designed in such a way that, when fitted together, a cone-shaped nozzle body is obtained.

The remaining region, the tip region and, if required, the nozzle-body part can advantageously have steps at their circumferential edges for the purpose in each case of their mutual positioning in the axial direction. These parts can then be inserted into one another telescopically in the end region, leading to a particularly stable connection.

According to a further embodiment of the invention, the nozzle electrode is held with the aid of a cap element which accommodates it, which is composed of electrically conducting material and which is electrically insulated from the nozzle electrode. Rapid exchange of the nozzle electrode is thereby possible, making it possible to shorten stoppage times of installations in which the nozzle is used.

According to another embodiment of the invention, the cap element can be connected to a sleeve of electrically conducting material which surrounds the nozzle body and via which the cap element is in electrical contact with the remaining region of the nozzle body.

Thus, in the nozzle according to the invention, the nozzle electrode and the tip region, on the one hand, are electrically connected to one another while, on the other hand, the cap element, the sleeve and the remaining region of the nozzle body are electrically connected to one another. The last-mentioned subassembly forms a shield for the first-mentioned subassembly and, at the same time, a shield for a signal lead which, starting from the tip region, passes between the sleeve and the remaining region of the nozzle body, more precisely to a connecting socket in the side region of the nozzle.

However, it is not absolutely necessary to use a sleeve of the stated type. The cap element can also come into direct engagement with the remaining region of the nozzle body and in the process ensure shielding of the nozzle electrode and the signal lead.

According to still another embodiment of the invention, the nozzle electrode can be inserted into the tip region and can rest on the end face of the latter by means of an outer circumferential flange. A particularly slim nozzle shape can thereby be achieved. However, it is also possible for the nozzle electrode to engage around the tip region with a circumferential flange and rest on the end face of the latter by means of an inner step. In comparison with the conventional nozzle, a slimmer nozzle construction can be achieved in each case since the insulating body between the nozzle electrode and the tip region is dispensed with. The cap element then pulls the nozzle electrode against the tip region of the nozzle body via the circumferential flange.

According to yet another advantageous embodiment, the nozzle electrode is of conical design on the outside. A cap element of corresponding conical design on the inside can then pull the nozzle electrode against the tip region without the necessity for the presence of an outer circumferential flange on the nozzle electrode. The cap element is electrically insulated from the nozzle electrode, for example by an insulating layer on the cap element, the layer being present at least in the region of contact with the nozzle electrode.

The insulating layer, which is a surface coating, can, for example, be an oxide, anodized or ceramic coating. The cap element is preferably designed as a cap nut, which can be screwed internally or externally to the sleeve.

According to another, very advantageous embodiment of the invention, the nozzle body is surrounded by a sleeve of electrically conducting material which lies at a distance from it and is in electrical contact with the remaining region of the nozzle body. The sleeve carries at its tip a removable shielding sleeve which is in electrical contact with the sleeve and at least partially surrounds the nozzle electrode, is composed of electrically conducting material and is electrically insulated from the nozzle electrode. Furthermore, the nozzle electrode is connected directly to the tip region of the nozzle body.

Here, a non-positive connection between the nozzle electrode and the tip region of the nozzle body is thus effected directly without the necessity for further holding devices. The nozzle electrode can advantageously be screwed to the tip region of the nozzle body. In this arrangement, the nozzle electrode can be screwed into the tip region of the nozzle body. However, the nozzle electrode and the tip region of the nozzle body can also be connected to one another by means of a bayonet catch or by means of a suitably designed lock-in/snap-in catch. In this arrangement, the shielding sleeve partially covers the nozzle electrode or covers it as far as the electrode tip.

According to a further embodiment of the invention, the nozzle body is surrounded by a sleeve of electrically conducting material which lies at a distance from the sleeve and is in electrical contact with the remaining region of the nozzle body. The sleeve carries at its tip a removable shielding sleeve which is in electrical contact with the sleeve and at least partially surrounds the nozzle electrode, is composed of electrically conducting material and is electrically insulated from the nozzle electrode. The nozzle electrode, with a foot part, is introducible from outside into the shielding sleeve and connectable to the shielding sleeve.

The foot part can preferably be screwed into the shielding sleeve, more precisely until the foot part or the nozzle electrode comes into electrical contact with the tip region of the nozzle body. In the region of the screw thread, the nozzle electrode and the shielding sleeve are electrically insulated from one another, for example by a suitable surface coating, which can, for example, be on the shielding sleeve.

It is very advantageous in the last-mentioned nozzles according to the invention that the nozzle electrode can be removed readily from the tip region of the nozzle body without other components having to be detached for this purpose. As a result, the nozzle electrode can be exchanged very simply and in a relatively short time if this is desired.

The shielding sleeve can preferably be screwed to the above-mentioned sleeve, it being possible, for example, for the shielding sleeve to be screwed into an internal thread of the sleeve.

The shielding sleeve and the nozzle electrode are at a different potential, making it necessary to electrically insulate them from one another. For this purpose, the shielding sleeve can bear an electrically insulating surface coating, particularly where a contact with the nozzle electrode occurs. The surface coating can, for example, be an oxide, anodized or ceramic layer. The shielding sleeve is preferably composed of aluminum. The electrically insulating surface coating of the shielding sleeve can also cover the entire surface of the shielding sleeve, with the exception of the region of connection between the shielding sleeve and the sleeve since an electrical contact must be established between these two elements.

According to another further embodiment of the invention, the nozzle electrode has a circumferential bead which covers the frontal edge of the shielding sleeve. In this way, the frontal edge of the shielding sleeve is protected from damage which can occur, for example, due to hot material spatter which forms during the working or welding operation. If metal spatter does nevertheless fall into the region between the nozzle electrode and the shielding sleeve, this spatter does not cause a short circuit since the shielding sleeve bears an electrically insulating surface coating at least in this region.

The novel features which are considered as characteristic for the invention are set forth in particular in the appended claims. The invention itself, however, both as to its construction and its method of operation, together with addi-

DETAILED DESCRIPTION OF THE PREFERRED EMBODIMENTS

Figure 1:
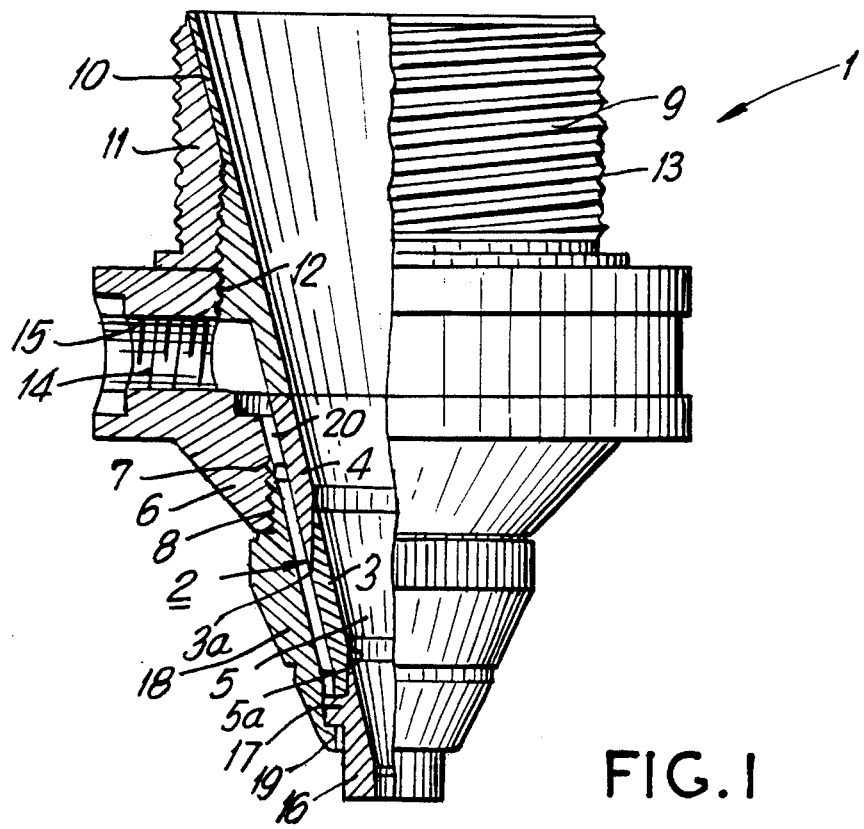
FIG. 1 shows, on the left, an axial section and, on the right, a side view of a nozzle in accordance with a first embodiment of the invention, in which the nozzle electrode is held by a cap nut and is inserted into the tip region.

A nozzle 1 in accordance with FIG. 1 has a nozzle body 2, to which belongs a tip region 3 and a remaining region 4 of the nozzle body 2. The nozzle body 2 is of conical design, both on the outside and on the inside. Only the free end of the tip region 3 has a hollow cylinder shape, with the result that a nozzle channel 5 present in the interior of the nozzle body 2 tapers conically towards the tip of the nozzle 1 and finally makes a transition into a cylindrical channel 5a. The rear part of the cone forms the remaining region 4, while the front part of the cone forms the tip region 3.

As can be seen from FIG. 1, the tip region 3 and the remaining region 4 of the nozzle body 2 are inserted into and fit in one another and are insulated from one another, with the result that there is no electrically conducting connection between them. A step 3a on the outer circumferential edge of the tip region 3 serves for the axial positioning of the remaining region 4. The end face of the remaining region 4 strikes the step 3a. In their end region, the parts 3 and 4 thus lie telescopically one inside the other.

In the present first illustrative embodiment, the remaining region 4 of the nozzle body 2 is composed of aluminum which is surface-anodized. This anodized layer 3b forms the electrical insulation between the remaining region 4 and the tip region 3. The tip region 3 is manufactured from brass. Both parts 3 and 4 are bonded together firmly, more precisely by means of a very thin layer of a ceramic adhesive, this being particularly advantageous since this is very temperature-stable and, in addition, has an insulating effect.

The nozzle body 2 is mounted by its upper part in a sleeve-shaped element 6, and projects through a central opening 7 of the sleeve-shaped element 6 and is supported with an outer circumferential flange (not shown) in the interior of the sleeve-shaped element 6. In its upper part, the opening 7 in the sleeve-shaped element 6 is likewise of conical design, with the result that, in the upper region of the nozzle body 2, the outer circumferential face comes to rest on it. Thus, a centering of the nozzle body 2 relative to the sleeve-shaped element 6 is achieved. In its lower region facing the nozzle tip, the central opening 7 furthermore has a cylindrical shape, there being an internal thread 8 there.

In order to clamp the nozzle body 2 firmly in the sleeve-shaped element 6, a clamping element 9 is screwed into the sleeve-shaped element from the side opposite the nozzle tip. The clamping element comprises an inner body 10 and an outer body 11. The inner body 10 is composed, for example, of steel and, in its interior, is of conical design, such that the nozzle channel 5 is widened by it towards the upper end of the nozzle 1 when the clamping element 9 is connected to the sleeve-shaped element 6. In this state, the inner body 10 presses on the upper edge of the nozzle body 2 and thus prevents the nozzle body 2 from falling out of the sleeve-shaped element 6. The inner body 10 is here screwed to the sleeve-shaped element 6, for which purpose a threaded portion 12 on the outer circumferential edge of the inner body 10 engages in a corresponding internal thread of an axial bore in the upper region of the sleeve-shaped element 6.

The outer body 11 is situated above the threaded portion 12 and completely surrounds the inner body 10. Inner body 10 and outer body 11 can, for example, be bonded together, the outer body 11 being composed of electrically insulating material. The outer body 11, which is, for example, manufactured from plastic, has a cylindrical circumferential face which is coaxial to the central axis 1a of the nozzle 1 and bears an external thread 13. Via this external thread 13, the nozzle 1 can be screwed into a holder (not shown) of a material machining device. In this arrangement, the nozzle 1 is at the same time electrically insulated from the material machining device, this being due to the non-conducting properties of the outer body 11.

The sleeve-shaped element 6 furthermore has a radial through-channel 14 with an internal thread 15, it thus being possible to screw a connecting socket (not shown) into the radial through channel. The connecting socket has a central and insulated inner conductor and an outer conductor provided with an external thread, this external thread engaging in the internal thread 15 and being in electrical contact with the sleeve-shaped element 6. The connecting socket serves for the connection of a coaxial cable.

A nozzle electrode, which is composed, for example, of copper, bears the reference numeral 16. The nozzle electrode is of cylindrical design on the outside and has an outer circumferential flange 17. It is inserted into and fits in the cylindrical part of the tip region 3 and, with its outer circumferential flange 17, rests on the end face of the tip region 3. In this arrangement, a conical channel extending in the interior of the nozzle electrode 16 continues the nozzle channel 5 as far as the tip of the nozzle electrode 16. Starting from the upper edge of the clamping element 9, the nozzle channel 5 thus tapers uniformly as far as the tip end of the nozzle electrode 16 and makes a transition into an axial channel only in the last part, at the end face of the nozzle electrode 16.

The nozzle electrode 16 is in direct electrical contact with the tip region 3, with the result that both parts are at the same potential.

To secure the nozzle electrode 16 on the tip region 3, a cap element 18 is used, being designed in this case as a cap nut. The cap element 18 is likewise composed of electrically conducting material but is electrically insulated from the nozzle electrode 16. For this purpose, the cap element can carry an insulating layer 18A, for example a surface oxide layer, at least in the region of connection to the nozzle electrode 16. The cap element 18 can be manufactured from aluminum and the oxide or insulating layer would thus be an anodized layer.

One edge 19 of the cap element 18 engages behind the outer circumferential flange 17 of the nozzle electrode 16 and thus pulls the nozzle electrode 16 against the end face of the tip region 3 when the cap element 18 is screwed by an external thread directed towards the sleeve-shaped element 6 into the internal thread 8 of the central opening 7. During this process, the cap element 18 comes to lie at a distance from the nozzle body 2 and surrounds the latter completely.

On the one hand, as already mentioned, the cap element 18 and the sleeve-shaped element 6 are connected in electrically conducting fashion via the thread 8 and, on the other hand, the sleeve-shaped element 6 is connected in electrically conducting fashion to the remaining region 4 of the nozzle body 2 because both parts rest directly one upon the other and, in addition, are connected to one another electrically via the threaded portion 12 and the inner body 10.

In contrast, the tip region 3 and the nozzle electrode 16 are connected to one another in electrically conducting fashion. At the same time, however, the tip region 3 is electrically insulated from the remaining region 4 by the insulating layer lying between them, while the nozzle electrode 16 is electrically insulated from the cap element 18 by the surface coating of the cap element 18 in the connection region of the two parts.

In order to take off a sensor signal from the nozzle electrode 16 via the tip region 3, the tip region 3 is connected to an insulated wire (not shown) which passes through a region 20 between nozzle body 2 and cap element 18 or sleeve element 16 and is connected to the central conductor of the plug socket. The wire is therefore shielded by the cap element 18, the sleeve-shaped element 6 and the remaining region 4 of the nozzle body 2 while, on the other hand, the tip region 3 and a large part of the nozzle electrode 16 are likewise shielded by the cap element 18. Influencing of the sensor signal taken off at the nozzle electrode 16 by the material machining device into which the nozzle 1 is later screwed is likewise avoided because the remaining region 4 of the nozzle body 2 is also at shield potential.

Figure 2:
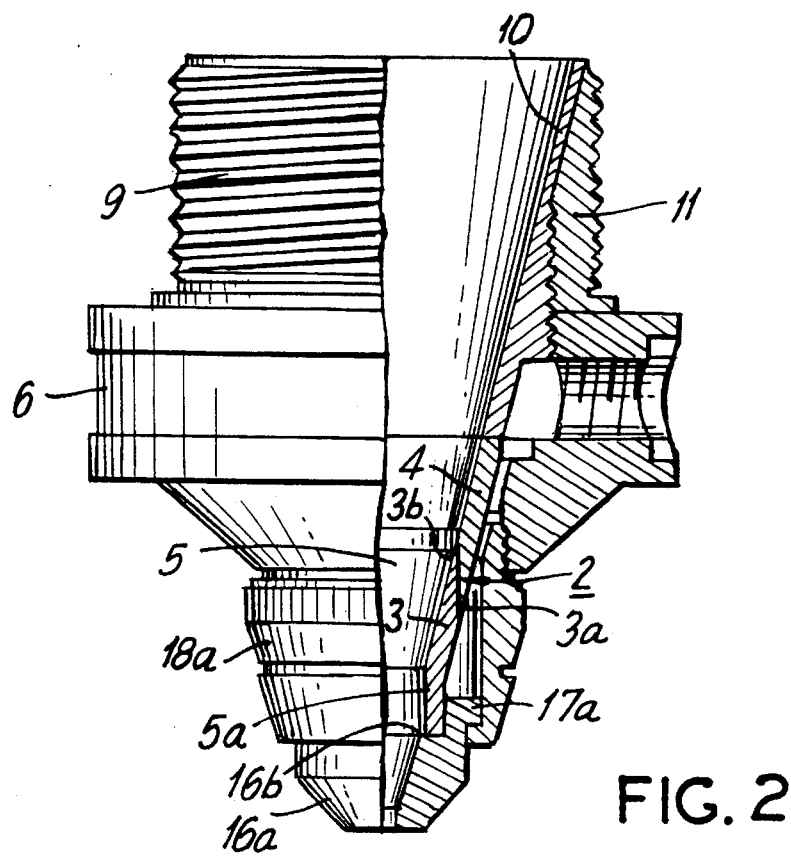
FIG. 2 shows, on the left, a side view and, on the right, an axial section of a nozzle in accordance with a second embodiment of the invention, in which the nozzle electrode is held by a cap nut and is placed on the tip region.

FIG. 2 shows a second illustrative embodiment of the invention, in which there are modifications in the region of the nozzle electrode and of the cap element. Identical elements are provided with the same reference numerals and are not explained again. In FIG. 2, a nozzle electrode is provided with the reference numeral 16a, while a cap element bears the reference numeral 18a and is likewise designed as a cap nut. The nozzle electrode 16a here engages around the tip region 3 or the cylindrical part of the latter, an inner step 16b of the nozzle electrode 16a striking the end face of the tip region 3. An outer circumferential flange 17a is grasped by the claw-shaped tip region of the cap element 18a, with the result that the entire nozzle electrode 16a is pulled against the nozzle body 2 when the cap element 18a is screwed into the sleeve-shaped element 6. Here too, the nozzle electrode 16a is electrically insulated from the cap element 18a, more precisely by a corresponding insulating coating in the connection region of the two parts.

A higher or lower lateral sensitivity of the nozzle 1 can be obtained depending on whether the nozzle electrode 16 with the cap element 18 or the nozzle electrode 16a with the cap element 18a is used.

Figure 3:
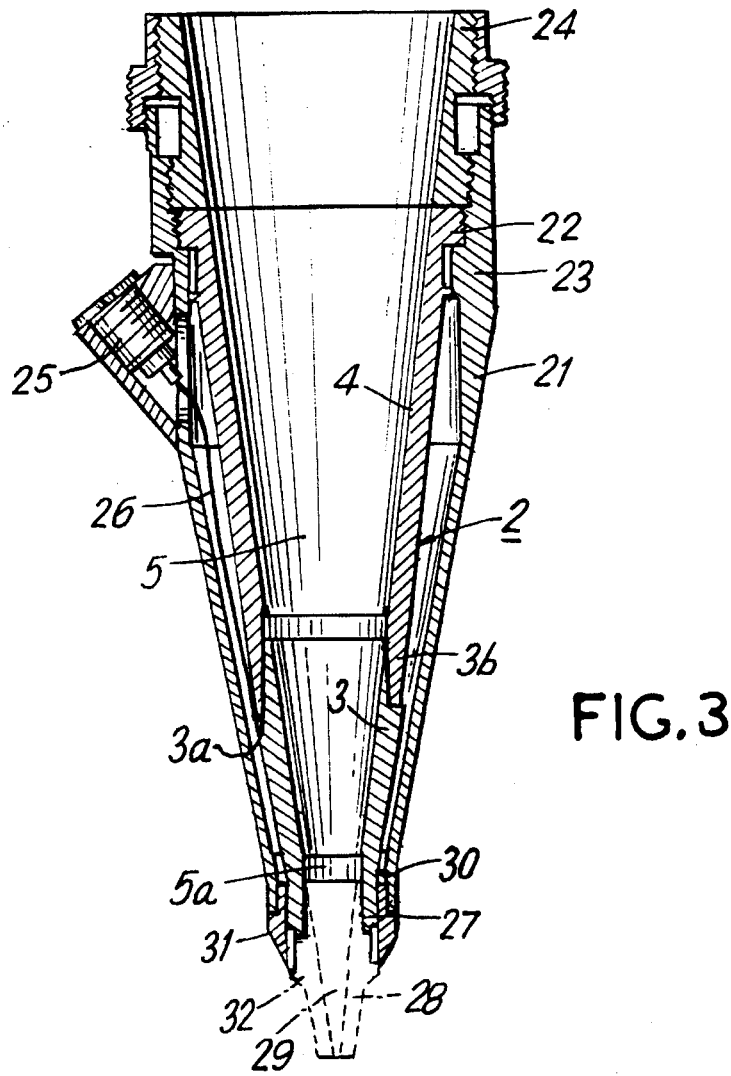
FIG. 3 shows an axial section through a nozzle in accordance with a third illustrative embodiment of the invention, with a nozzle electrode screwed directly into the tip region.

FIG. 3 shows a third illustrative embodiment in accordance with the invention, in which parts identical to those in FIGS. 1 and 2 are provided with the same reference numerals and are not described again in detail.

A nozzle in accordance with FIG. 3 again has the nozzle body 2 to which belong the tip region 3 and the remaining region 4 of the nozzle body 2. The nozzle body 2 is of cone-shaped design, both on the outside and on the inside. Only the free end of the tip region 3 has the hollow-cylinder shape, the nozzle channel 5 present in the interior of the nozzle body 2 tapering conically towards the tip of the nozzle 1 and finally making a transition into a cylindrical channel 5a.

As can be seen from FIG. 3, the tip region 3 and the remaining region 4 of the nozzle body 2 are inserted into and fit in one another and are insulated from one another, with the result that there is no electrically conducting connection between them. The step 3a on the outer circumferential edge of the tip region 3 serves for the axial positioning of the remaining region 4. The end face of the remaining region 4 strikes the step 3a. The parts 3 and 4 thus lie telescopically one inside the other.

In the present third illustrative embodiment, the remaining region 4 of the nozzle body 2 is composed of aluminium which is surface-anodized. This anodized layer forms the electrical insulation between the remaining region 4 and the tip region 3. The tip region 3 is manufactured from brass. Both parts 3 and 4 are bonded together firmly, more precisely by means of a very thin layer of a ceramic adhesive, this being particularly advantageous since this is very temperature-stable and, in addition, has an electrically insulating effect.

The nozzle body 2 is mounted in a sleeve-shaped element 21 (sleeve), and more precisely is centered relative to the latter. Here, the remaining region 4 rests with a shoulder 22 on a projection 23 of the sleeve-shaped element 21 (sleeve). A top part 24 with an internal taper and an external thread is screwed into the upper region of the sleeve-shaped element 21 and presses the shoulder 22 against the projection 23.

The sleeve-shaped element 21 is composed, for example, of aluminum and is in electrical contact with the remaining region 4 of the nozzle body 2. Shield potential comes to be applied to both elements 4 and 21, more precisely via the shielded lead of a plug which is received in a plug socket 25 which is attached to the outer circumferential edge of the sleeve-shaped element 21. A signal lead 26 of the plug socket 25 is electrically connected to the tip region 3 of the nozzle body 2. The signal lead 26 extends in the space between elements 4 and 21. In the present case, the sleeve-shaped element 21 is taken such a distance towards the nozzle tip that it very largely covers the tip region 3 of the nozzle body 2.

As already mentioned, the tip region 3 has the cylindrical channel 5a, in which there is an internal thread 27. Screwed into this internal thread 27 by a corresponding external thread is a nozzle electrode 28 which is in direct electrical contact with the tip region 3. The nozzle electrode 28 is manufactured from electrically conducting material, for example from copper, and, in the present case, has a conical shape. However, it can also be of cylindrical design on the outside. An inner channel 29 of the nozzle electrode 28 is chosen in such a way that it continues the channel 5 conically virtually as far as the tip of the nozzle electrode 28.

The sleeve-shaped element 21, which serves to shield the nozzle body 2, extends virtually as far as the end face of the tip region 3 and there likewise has a cylindrical channel, in which there is an internal thread 30. Screwed into this internal thread 30 by a corresponding external thread is a shielding sleeve 31 which projects forwards beyond the tip region 3 and also partially engages around a foot part of the nozzle electrode 28 circumferentially. The shielding sleeve 31 is in direct electrical contact with the sleeve-shaped element 21, with the result that it too comes to be at shield potential. By means of the shielding sleeve 31, the upper part of the nozzle electrode 28 is in practice also shielded. To be more precise, the threaded region of the shielding sleeve 31 comes to lie between the sleeve-shaped element 21 and the tip region 3, the shielding sleeve 31 extending further, beyond the frontal edge region of the tip region 3. It can also cover or shield the nozzle electrode 28 for a greater distance than shown in the direction of the nozzle tip.

The shielding sleeve 31 is preferably provided with an electrically insulating surface coating, except in its threaded portion, since an electrically conducting connection to the sleeve-shaped element 21 must be established there. The surface coating can, for example, be an oxide layer or anodized layer if the shielding sleeve 31 is manufactured from an appropriate metal. Otherwise, it is electrically insulated from the tip region 3 and the nozzle electrode 28 so that it also is possible to establish a mechanical contact between these elements in order to obtain a structural stiffening in the region of the nozzle tip.

In the present illustrative embodiment, the nozzle electrode 28 is provided with a circumferential bead 32 which covers the frontal region of the shielding sleeve 31 and thus protects it from metal spatter which occurs under certain circumstances when working a workpiece, e.g. during welding. In particular, the circumferential bead 32 prevents such metal spatter from entering the region between the nozzle electrode 28 and the shielding sleeve 31 and thus causing damage there. Since the shielding sleeve 31 bears an electrically insulating surface coating, it is virtually impossible for metal spatter in the-region between the shielding sleeve 31 and the nozzle electrode 28 to lead to short circuits.

The nozzle electrode 28 can be unscrewed from the tip region 3 in a simple manner without the necessity of detaching other parts for this purpose. It can thus easily be replaced by another one. If matching of the geometry of the shielding sleeve 31 is necessary in this context, the shielding sleeve 28 can likewise easily be unscrewed from the sleeve-shaped element 21 and replaced by another suitable one. The shielding sleeve 31 and the nozzle electrode 28 can thus be exchanged very rapidly, leading to better availability of the nozzle.

Figure 4:
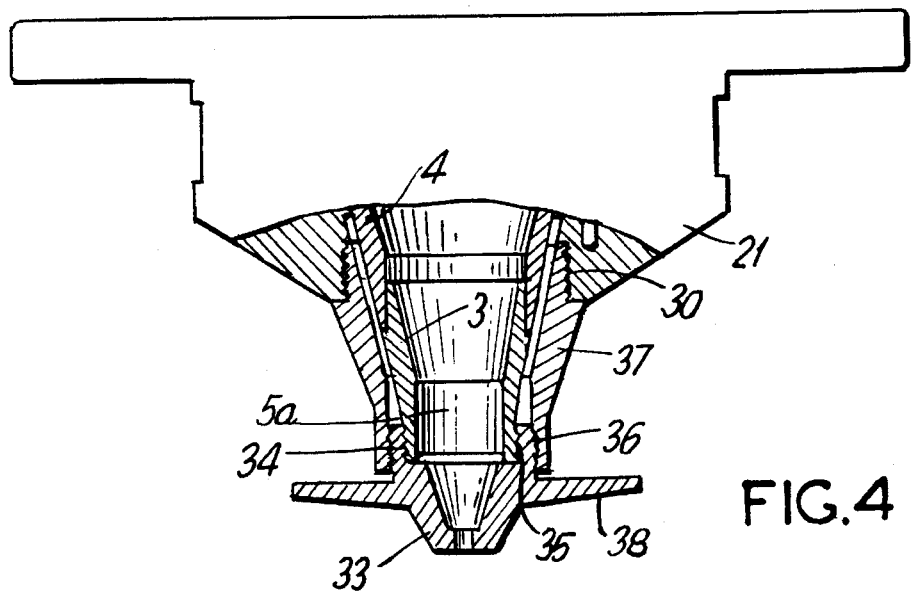
FIG. 4 shows an axial section through a nozzle in accordance with a fourth illustrative embodiment of the invention, with a nozzle electrode screwed into the shielding sleeve.

A fourth illustrative embodiment of a nozzle in accordance with the invention is depicted in FIG. 4. Identical elements to those in FIG. 1 are here provided with the same reference numerals. They are not described again.

As a modification to the illustrative embodiment in accordance with FIG. 3, a nozzle electrode 33 is here placed directly on the end face of the tip region 3 without being connected directly to the latter. On the contrary, the nozzle electrode 33 has a projection 34 (foot part) with an external thread 35 which is screwed into an internal thread 36 of a shielding sleeve 37 which, for its part, is screwed by a corresponding external thread into the internal thread 30 of the sleeve-shaped element 21, which, in this case, extends, for example, only as far as the frontal edge of the remaining region 4.

The nozzle electrode 33 is in electrical contact with the tip region 3, which, for its part, is connected via a shielded or insulated lead (not shown) to the signal terminal of a plug socket (not shown). A sensor signal is thus conducted from the nozzle electrode 33, via the tip region 3 and the head, to the signal terminal of the plug socket. The nozzle electrode 33, on the other hand, is electrically insulated from the shielding sleeve 37, for which purpose the shielding sleeve 37 can be provided in the region of the internal thread 36 with an electrically insulating surface coating, for example with an oxide layer. The shielding sleeve 37 is electrically connected to the sleeve-shaped element 21, with the result that the shield potential also reaches the shielding sleeve 37 which surrounds the tip region 3.

A circumferential bead 38 of the nozzle electrode 33 serves to protect the shielding sleeve 37 against metal spatter, which can arise during the working operation. If such metal spatter nevertheless gets behind the circumferential bead 38, this cannot lead to short circuits in the region between the shielding sleeve 37 and the nozzle electrode 33 if the shielding sleeve 37 is also provided with an insulating surface coating in its remaining or outer region.

While the invention has been illustrated and described as embodied in a nozzle for a tool for the working of material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A nozzle for a tool for working of material, comprising a nozzle body composed of electrically conductive material, the nozzle body having a tip region that carries a nozzle electrode, the tip region of the nozzle body and a remaining region of the nozzle body being formed by separate parts; the nozzle electrode being in direct contact with the tip region, and the tip region being electrically insulated from and fixed to the remaining region of the nozzle body by an electrically insulating adhesive.

2. The nozzle as claimed in claim 1, wherein the adhesive is a ceramic adhesive.

3. The nozzle as claimed in claim 1, wherein the remaining region, the tip region and a nozzle body part, are insertable into one another at an end face.

4. The nozzle as claimed in claim 3, wherein the remaining region, the tip region and the nozzle-body part, have steps (3a) at their circumferential edges for mutual positioning in an axial direction.

5. A nozzle for a tool for working of material, comprising a nozzle body composed of electrically conductive material, the nozzle body having a tip region that carries a nozzle electrode, the tip region of the nozzle body and a remaining region of the nozzle body being formed by separate parts;

the nozzle electrode being in direct contact with the tip region, and the tip region being electrically insulated from the remaining region of the nozzle body, wherein at least one of the remaining region of the nozzle body and the tip region have an electrically insulating surface coating, at least in a region of connection of the two.

6. The nozzle as claimed in claim 5, wherein the electrically insulating surface coating is one of an oxide, an anodized and a ceramic coating.

7. A nozzle for a tool for working of material, comprising a nozzle body composed of electrically conductive material, the nozzle body having a tip region that carries a nozzle electrode, the tip region of the nozzle body and a remaining region of the nozzle body being formed by separate parts;

the nozzle electrode being in direct contact with the tip region, and the tip region being electrically insulated from the remaining region of the nozzle body, the nozzle further comprising a cap element that accommodates and holds the nozzle electrode, the cap element being composed of an electrically conducting material and being electrically insulated from the nozzle electrode.

8. The nozzle as claimed in claim 7, wherein the cap element is connectable to a sleeve of electrically conducting material which surrounds the nozzle body and via which the cap element is in electrical contact with the remaining region of the nozzle body.

9. The nozzle as claimed in claim 8, wherein, at least in a region of contact with the nozzle electrode, the cap element bears an electrically insulating surface coating.

10. The nozzle as claimed in claim 9, wherein the surface coating is one of an oxide, an anodized and a ceramic coating.

11. The nozzle as claimed in claim 8, wherein the cap element has cap nut which is screwed to the sleeve.

12. The nozzle as claimed in claim 7, wherein, at least in a region of contact with the nozzle electrode the cap element bears an electrically insulating surface coating.

13. The nozzle as claimed in claim 12, wherein the surface coating is one of an oxide, an anodized and a ceramic coating.

14. The nozzle as claimed in claim 7, wherein the nozzle electrode has an outer circumferential flange and is inserted into the tip region so as to rest on an end face of the tip region by means of the outer circumferential flange.

15. The nozzle as claimed in claim 14, wherein the cap element is provided so as to pull the nozzle electrode against the tip region via the circumferential flange.

16. The nozzle as claimed in claim 7, wherein the nozzle electrode has a circumferential flange that engages around the tip region so as to rest on the end face of the tip region by means of an inner step of the nozzle electrode.

17. The nozzle as claimed in claim 16, wherein the cap element is provided so as to pull the nozzle electrode against the tip region via the circumferential flange.

18. The nozzle as claimed in claim 7, wherein the nozzle electrode has an external conical shape and the cap element has a corresponding inner conical shape.

19. A nozzle for a tool for working of material, comprising a nozzle body composed of electrically conductive material, the nozzle body having a tip region that carries a nozzle electrode, the tip region of the nozzle body and a remaining region of the nozzle body being formed by separate parts, the nozzle electrode being in direct contact with the tip region, and the tip region being electrically insulated from the remaining region of the nozzle body;

wherein the nozzle body is surrounded by a sleeve of electrically conducting material which lies at a distance from the nozzle body and is in electrical contact with the remaining region of the nozzle body;

wherein the sleeve carries at its tip a removable shielding sleeve which is in electrical contact with the sleeve and at least partially surrounds a nozzle electrode, the shielding sleeve being composed of electrically conducting material and electrically insulated from the nozzle electrode; and wherein the nozzle electrode is connected directly to the tip region of the nozzle body.

20. The nozzle as claimed in claim 19, wherein the nozzle electrode is screwed into the tip region of the nozzle body.

21. The nozzle as claimed in claim 19, wherein the nozzle electrode and the tip region of the nozzle body are connected to one another by a bayonet catch.

22. The nozzle as claimed in claim 19, wherein the nozzle electrode and the tip region of the nozzle body are connected to one another by a lock-in catch.

23. The nozzle as claimed in claim 19, wherein the nozzle electrode has a circumferential boad that covers a frontal edge of the shielding sleeve.

24. A nozzle for a tool for working of material, comprising a nozzle body composed of electrically conductive material, the nozzle body having a tip region that carries a nozzle electrode, the tip region of the nozzle body and a remaining region of the nozzle body being formed by separate parts;

wherein the nozzle electrode being in direct contact with the tip region, and the tip region being electrically insulated from the remaining region of the nozzle body;

wherein the nozzle body is surrounded by a sleeve of electrically conducting material which lies at a distance from the nozzle body and is in electrical contact with the remaining region of the nozzle body;

wherein the sleeve carries at its tip a removable shielding sleeve which is in electrical contact with the sleeve and at least partially surrounds the nozzle electrode, the shielding sleeve being composed of electrically conducting material and electrically insulated fro the nozzle electrode; and wherein the nozzle electrode has a foot part, by which the nozzle electrode is introducible from the outside into the shielding sleeve and connected thereto.

25. The nozzle as claimed in claim 24, wherein the foot part can be screwed into the shielding sleeve.

26. The nozzle as claimed in claim 24, wherein the shielding sleeve is screwed to the sleeve.

27. The nozzle as claimed in claim 24, wherein the shielding sleeve bears an electrically insulating surface coating at least in a region of contact with the nozzle electrode.

28. The nozzle as claimed in claim 27, wherein the surface coating is one of an oxide, ananodized and a ceramic coating.

29. The nozzle as claimed in claim 24, wherein the nozzle electrode has a circumferential boad that covers a frontal edge of the shielding sleeve.

* * * * *